US010278539B2

(12) United States Patent
Zhang et al.

(10) Patent No.: US 10,278,539 B2
(45) Date of Patent: May 7, 2019

(54) TOASTER ACTUATING MECHANISM (71) Applicant: Shenzhen Crastal Technology Co., Ltd., Shenzhen, Guangdong Province (CN)

(72) Inventors: George Mohan Zhang, Shenzhen (CN); Huajin Chen, Shenzhen (CN); Yanbing Luo, Shenzhen (CN)

(73) Assignee: Shenzhen Crastal Technology Co., Ltd. (CN)

( * ) Notice: Subject to any disclaimer, the term of this patent is extended or adjusted under 35 U.S.C. 154(b) by 670 days.

(21) Appl. No.: 14/763,512

(22) PCT Filed: Apr. 10, 2014

(86) PCT No.: PCT/CN2014/075025
§ 371 (c)(1),
(2) Date: Jul. 25, 2015

(87) PCT Pub. No.: WO2014/201897
PCT Pub. Date: Dec. 24, 2014

(65) Prior Publication Data
US 2015/0351587 A1    Dec. 10, 2015

(30) Foreign Application Priority Data
Jun. 17, 2013   (CN) .......................... 2013 1 0238880

(51) Int. Cl.
A47J 37/08    (2006.01)

(52) U.S. Cl.
CPC ........... *A47J 37/08* (2013.01); *A47J 37/0821* (2013.01); *A47J 37/0857* (2013.01)

(58) Field of Classification Search
CPC ..... A47J 37/08; A47J 37/0821; A47J 37/0857
USPC ........................................... 99/325
See application file for complete search history.

(56) References Cited

U.S. PATENT DOCUMENTS

2008/0202347 A1*   8/2008   Chen ................... A47J 37/0814
                                                        99/326

* cited by examiner

*Primary Examiner* — Ibrahime A Abraham
*Assistant Examiner* — Spencer H. Kirkwood
(74) *Attorney, Agent, or Firm* — PROI Intellectual Property US (57) ABSTRACT An actuating mechanism for a toaster, and in particular a bread identification actuating mechanism for a toaster, comprises a toast frame arranged in a housing, a sliding rack capable of moving upwards and downwards, and a control circuit, a toast rack being coupled to the sliding rack, a bracket being fixed to one end of the toast rack, the bracket being hinged to the sliding rack: wherein the toaster actuating mechanism is provided with a sensing device for identifying an angular displacement of the bracket, and the bracket drives a light barrier, the sensing device being arranged on a movement tack of the light barrier, the light barrier being capable of blocking a sensing light passage of the sensing device, the sensing device being coupled to the control circuit via a data line.

4 Claims, 9 Drawing Sheets

TOASTER ACTUATING MECHANISM

CROSS REFERENCE TO RELATED APPLICATIONS

The present application is the US national stage of International Patent Application PCT/CN2014/075025 filed on Apr. 10, 2014, which, in turn, claims priority to Chinese Patent Application CN 2013 102 388 80.1 filed on Jun. 17, 2013.

TECHNICAL FIELD

The present invention relates to a toaster, and more particularly, relates to a bread identification actuating mechanism for a toaster.

BACKGROUND

A commercially available toaster is generally operated in the following manner. A handle of the toaster is manually pressed to move a sliding rack and a toast rack, which carries the bread, downwards to the bottom of a groove. At this time, a circuit is turned on through a switch, and windings of an electronic timer are powered on to render a ferrous piece to be attracted. The handle, the sliding rack and the toast rack are retained in their original positions, and heaters are powered on to toast the bread. After the bread is toasted for a predetermined time set by the electronic timer, the windings of the electronic timer are powered off, and the ferrous piece is thereby released. As a result, the sliding rack, the handle and the toast rack are driven together with the bread to move upwards to their normal positions under a pulling force of a spring. However, the structure of the conventional toaster has some disadvantages. For example, if the resilient force executed by the spring of the toast rack is too strong, a relatively small bread slice will be flicked up into air; and if the resilient force executed by the spring is too weak, a relatively large bread slice will fail to be elevated to its normal position, or a small bread slice will fail to be elevated high enough to take the toasted break out. Consequently, an automatic toaster has been provided, in which a motor is employed to drive a sliding rack to move upwards and downwards. However, the motor in this structure needs to be activated manually, and the toaster fails to automatically identify whether the break is placed into the toast rack.

SUMMARY

An objective of the present invention is to provide an actuating mechanism for a toaster, which is capable of identifying whether a break slice is placed into the toast rack.

The objective of the present invention is achieved by an actuating mechanism for a toaster, comprising a toast frame arranged in a housing, a sliding rack capable of moving upwards and downwards, and a control circuit, a toast rack being coupled to the sliding rack, a bracket being fixed to one end of the toast rack, the bracket being hinged to the sliding rack.

The actuating mechanism for a toaster is provided with a sensing device for identifying an angular displacement of the bracket, and the bracket drives a light barrier, the sensing device being arranged on a movement track of the light barrier, the light barrier being capable of blocking a sensing light passage of the sensing device, the sensing device being coupled to the control circuit via a data line.

Further, the light barrier is mounted on a tail portion of the bracket, the light barrier is capable of blocking the sensing light passage of the sensing device, a restoring spring is arranged on the bracket, one end of the restoring spring acting on the bracket, and the other end of the restoring spring acting on the sliding rack.

Optionally, the sensing device is fixed to an upper portion of a motor stand.

Optionally, the sensing device is fixed to a front supporting board of the toast frame.

Further, a front end face of the sliding rack is provided with a flange, the restoring spring being coupled between the flange and the bracket.

Further, the restoring spring is coupled between a front end face of the sliding rack and the bracket.

Further, a pick is hinged to a front end face of the sliding rack via a hinge point, a tension spring I being coupled to one end of the pick, and the light barrier being hinged to the other end of the pick; the bracket extends out of the sliding rack and is disposed at a lower portion between the hinge point of the pick and the coupling point the tension spring I; the light barrier corresponds to the sensing device in terms of position; the sliding rack is provided with a limit bar, the pick being disposed in a groove between the sliding rack and the limit bar; and a limit bump is arranged on a lateral side of the sliding rack corresponding to the light barrier.

Further, one end of a pick I is hinged to a front end face of the sliding rack via a hinge point, and the other end of the pick I is coupled to the light barrier; the bracket extends out of the sliding rack and is disposed at a lower portion between the hinge point of the pick I and the light barrier; and the light barrier corresponds to the sensing device in terms of position; the sliding rack is provided with a limit bar, the pick I being disposed in a groove between the sliding rack and the limit bar.

Preferably, the sensing device comprises infrared transmitting-receiving diodes that are oppositely arranged.

Preferably, the sensing device comprises a light sensitive element and a light-emitting diode that are oppositely arranged.

The toast rack according to the present invention can be driven to rotate upwards to a certain angle about a center defined by the hinge point under the resilient force of a spring. When a bread slice is placed into the toast rack, the toast rack is reset. The sensor can obtain a signal indicating that reset of the toast rack and transmit the signal to a control chip to control the toaster to be automatically initiated. The toaster according to the present invention is simple in structure and safe in use, and is of a low cost.

DETAILED DESCRIPTION

The present invention is further described with reference to specific embodiments.

Figure 1:
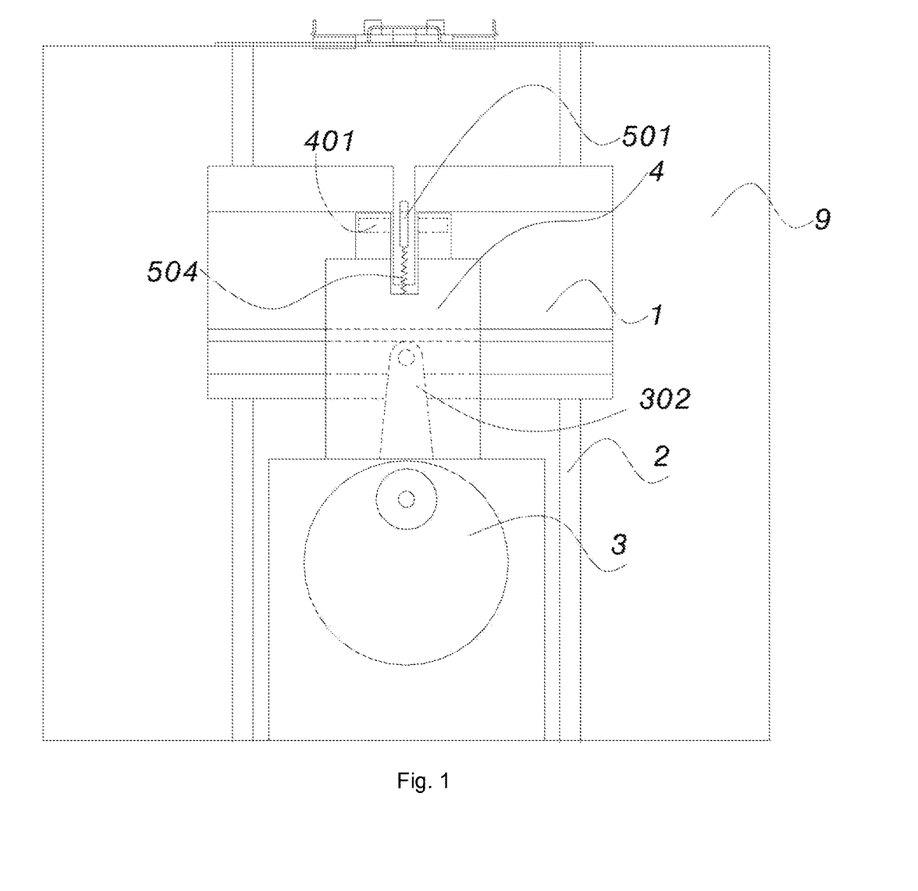
FIG. 1 is a schematic view of one preferred embodiment of the present invention.
Figure 2:
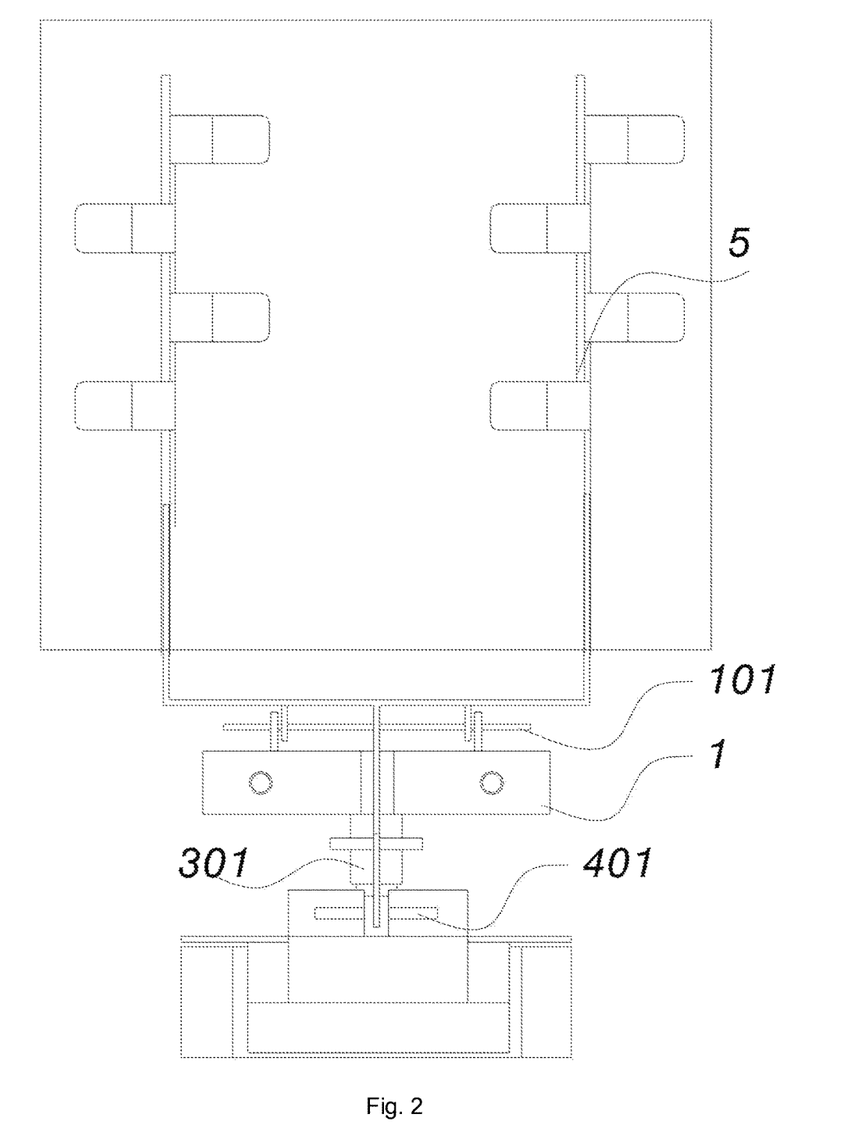
FIG. 2 is a top view of FIG. 1.
Figure 3:
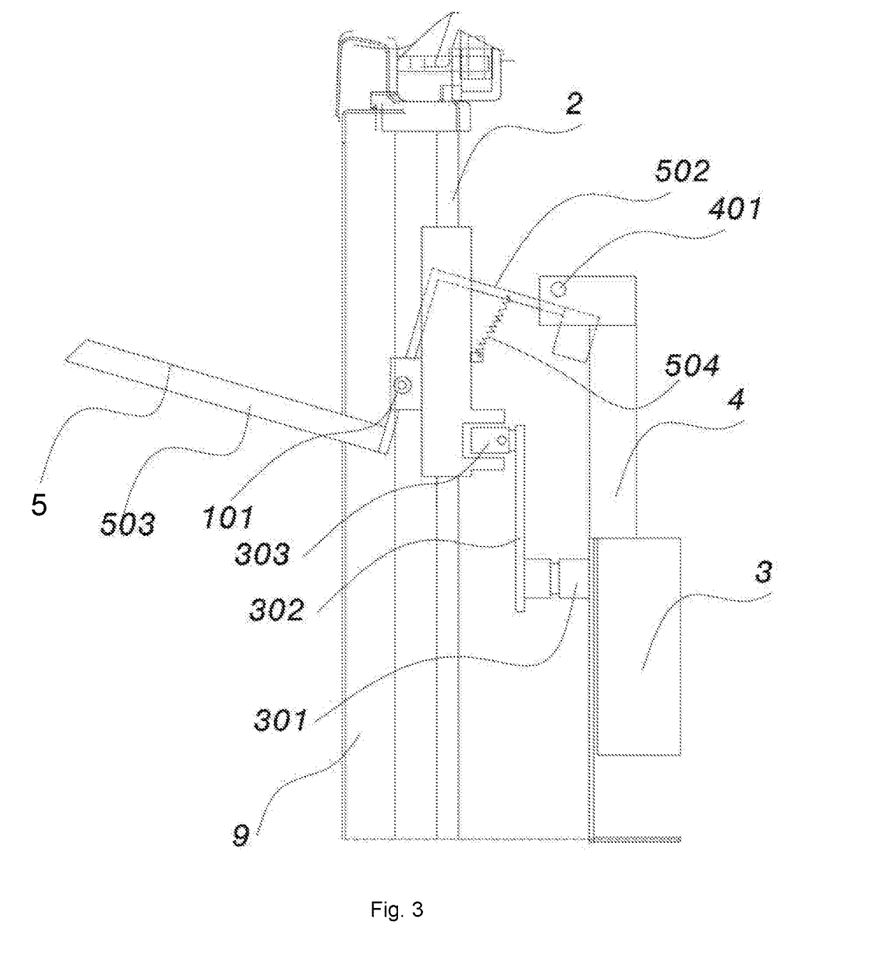
FIG. 3 is a left view of FIG. 1.
Figure 4:
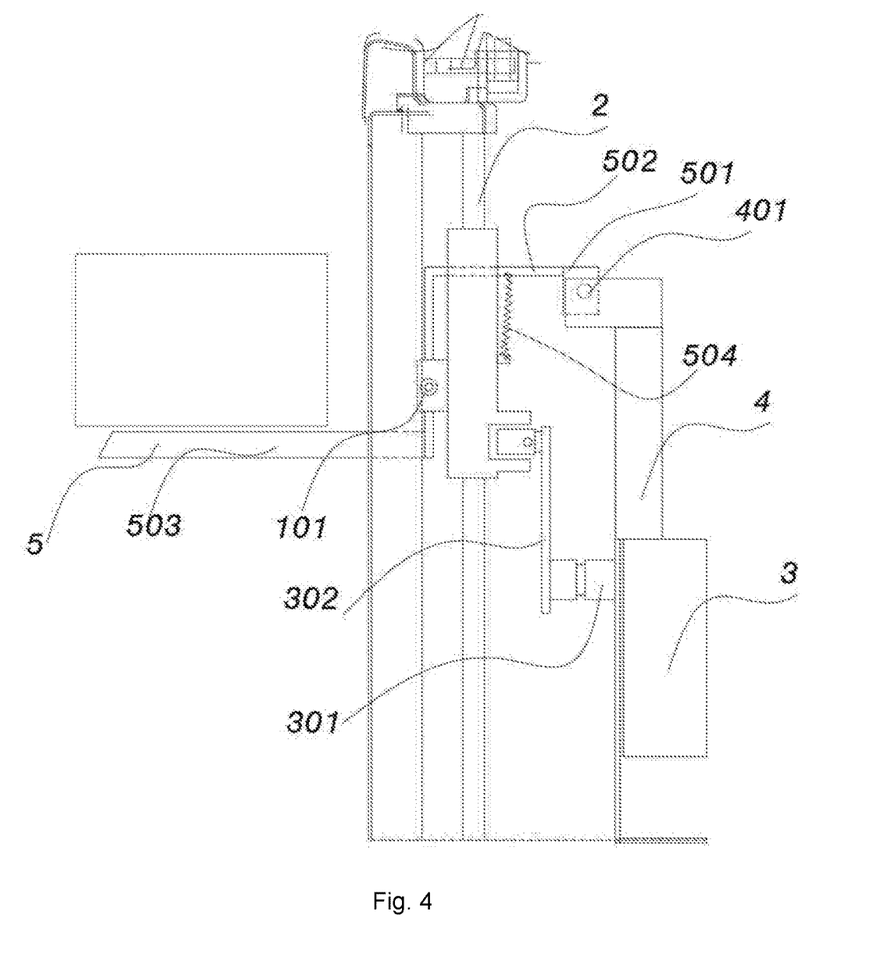
FIG. 4 is a schematic view of a toast rack into which bread is placed in FIG. 3.
Figure 5:
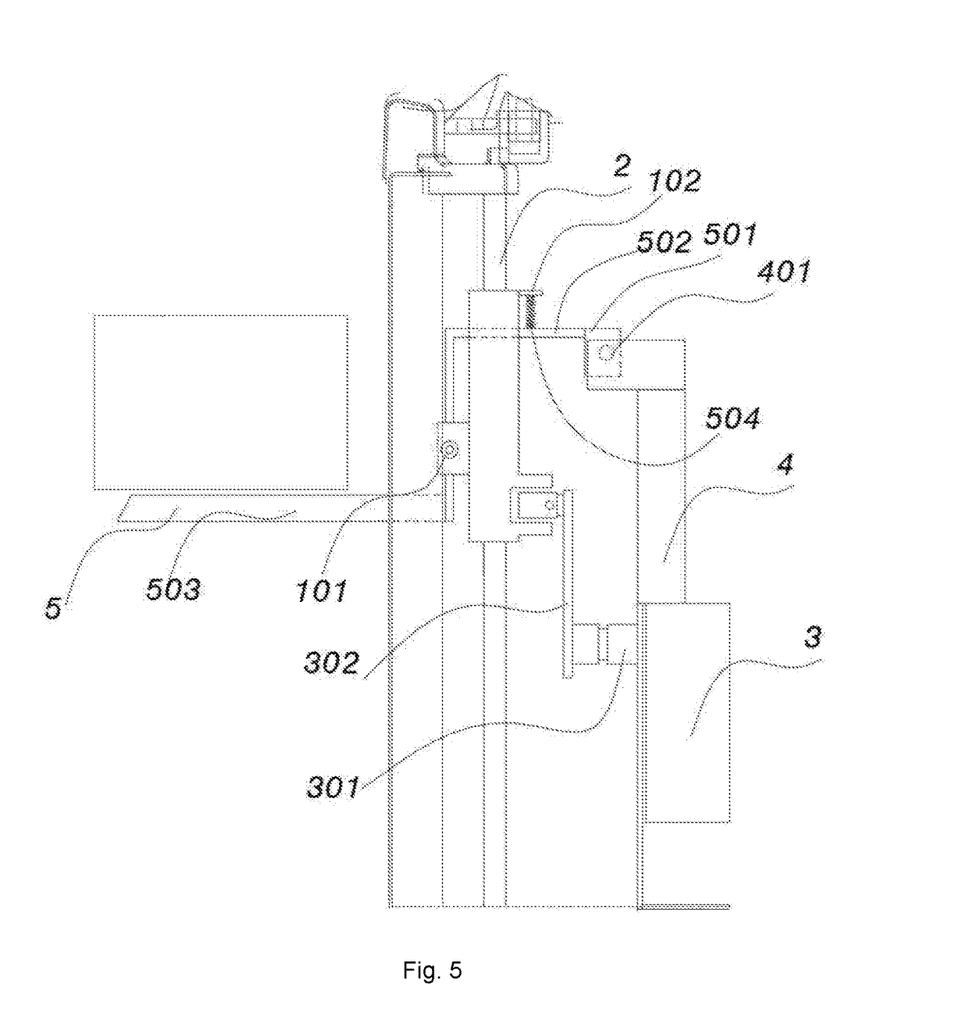
FIG. 5 is a schematic view of different connections of a spring according to an embodiment of the present invention.

As illustrated in FIG. 1, FIG. 2, and FIG. 3, an actuating mechanism for a roaster comprises a toast frame 9 arranged in a housing, a sliding rack 1 capable of moving upwards and downwards, and a control circuit. A vertical shaft 2 is fixed to the toast frame 9. The vertical shaft 2 is provided with the sliding rack 1. The sliding rack 1 is slidingly coupled to the vertical shaft 2, and is capable of sliding upwards and downwards along the vertical shaft 2. A fixed toast bracket 4 is arranged in the housing. A motor 3 is fixed to the fixed toast bracket 4. A driving lever 302 is fixed to an output shaft 301 of the motor 3. A rotation wheel 303 is hinged to the driving lever 302. The rotation wheel 303 is slidingly coupled to a transverse guiding groove on the sliding rack 1. A toast rack 5 is coupled to the sliding rack 1. A bracket 502 is fixed to one end of the toast rack 5. The toast rack 5 and the bracket 502 fixed to the toast rack 5 are hinged to a hinge point on the sliding rack 1. A light barrier 501 is fixed to the bracket 502. The light barrier 501 passes through an upper portion of the sliding rack 1. A front end of the sliding rack 1 is provided with a flange 102. A restoring spring 504 is coupled between the flange 102 and the bracket 502. As illustrated in FIG. 5, alternatively, the restoring spring 504 is coupled between the front end face of the sliding rack 1 and the bracket 502. As illustrated in FIG. 4, in this embodiment, the restoring spring is a tension spring. The actuating mechanism is provided with a sensing device 401 for identifying an angular displacement of the bracket 502. The sensing device 401 is arranged at a front end of the sliding rack 1. In this embodiment, the sensing device 401 is fixed to an upper portion of the fixed toast bracket 4. The sensing device 401, in terms of position, corresponds to the light barrier 501 passing through the upper portion of the sliding rack 1 and thus fixed. When no bread is placed into the toast rack 5 of the toaster, the toast rack 5 is capable of rotating upwards at an angle under a resilient force or a tension force of the restoring spring 504, such that the light barrier 501 does not block the infrared transmitting-receiving diodes on the sensing device 401 from transmitting and receiving infrared light. When bread is placed into the toast rack 5, under the gravity of the bread, the toast rack 5 overcomes the acting force of the restoring spring 504, such that the toast rack 5 rotates about the hinge point 101 on the sliding rack 1 and the light barrier 501 rotates upwards about the hinge point 101. Therefore, the light barrier 501 moves upwards for a distance, and is disposed in a sensing passage of the sensing device 401, that is, inbetween the pair transistors of the infrared transmitting-receiving diodes, which blocks light transmitted by the infrared transmitting diode, such that the infrared receiving diode fails to receive infrared light transmitted by the infrared transmitting diode.

By detecting whether the infrared receiving diode receives the infrared light transmitted by the infrared transmitting diode in the sensing device 401 and detecting changes of the working state thus generated, the control circuit acquires whether bread is placed into the toast rack 5. Accordingly, when the bread is placed into a toast slot on the toast rack 5, under the gravity of the bread, a free end of the toast rack 5 moves downwards, the bracket 502 fixed to the other end of the toast rack 5 and the light barrier 501 cocks and moves upwards, and a transmitting-receiving light path formed by the infrared transmitting-receiving diodes is disposed above the bracket 502 fixed to the other end of the toast rack 5 and the light barrier 501. A signal is then generated when the light barrier 501 moves upwards and blocks the infrared light from passing along the light path, and the signal is transmitted to a CPU control circuit. As illustrated in FIG. 4, the CPU control circuit determines that the toast rack 5 has acted and thereby controls the motor 3 to rotate. The output shaft 301 of the motor 3 rotates such that the driving lever 302 and a contact fixed to the output shaft of the motor rotate at 360 degrees. The sliding rack 1 moves downwards under a pushing force caused by the rotation wheel 303 hinged to the driving lever 302 fixed to the output shaft of the sliding rack 1 to the transverse guiding groove on the sliding rack. When the sliding rack 1 and the toast rack 5 hinged to the sliding rack 1 moves downwards to reach a lower limit at the bottom of a toast slot of the toaster, the contact exactly arrives to the position of a lower limit switch. The trolley wheel on the contact contacts the lower limit switch to turn off the lower limit switch. In this case, upon receiving a signal indicating that the lower limit switch is turned off, the CPU control circuit controls a relay of the motor to make it turned off, and accordingly the motor 3 stops rotating. In the mean time, the CPU control circuit controls a heating element to be powered on and start generating heat for toasting bread in the toaster. At the same time, the CPU control circuit actuates a timer. When the toast time reaches a preset time, the CPU control circuit makes the heating wires powered off, and accordingly the heating element stops generating heat. In the mean time, the CPU control circuit controls the relay of the motor to make it turned on, and accordingly the motor 3 starts rotating. Since the sliding rack 1 is at the utmost bottom, regardless of to which direction the output shaft of the motor 3 rotates towards, the driving lever 302 fixed to the output shaft of the motor causes an upward pushing force to the sliding rack 1, and accordingly the sliding rack moves upwards under the upward pushing force caused by the driving lever 302 fixed to the output shaft of the motor. When the sliding rack 1 moves upwards to reach an upper limit, and the contact rotates to the position of an upper limit switch, the trolley wheel of the contact contacts the upper limit switch, and makes the upper limit switch turned off. The sliding rack 1 and the toast rack 5 supports the bread to reach the upper limit, and the CPU control circuit controls the motor 3 to stop rotating. In this case, the bread is taken out, and the free end of the toast rack 5 cocks upwards under the resilient force or pulling force of the spring 504 or the tension spring 504. In this way, a bread toast process is finished in the toaster.

Figure 6:
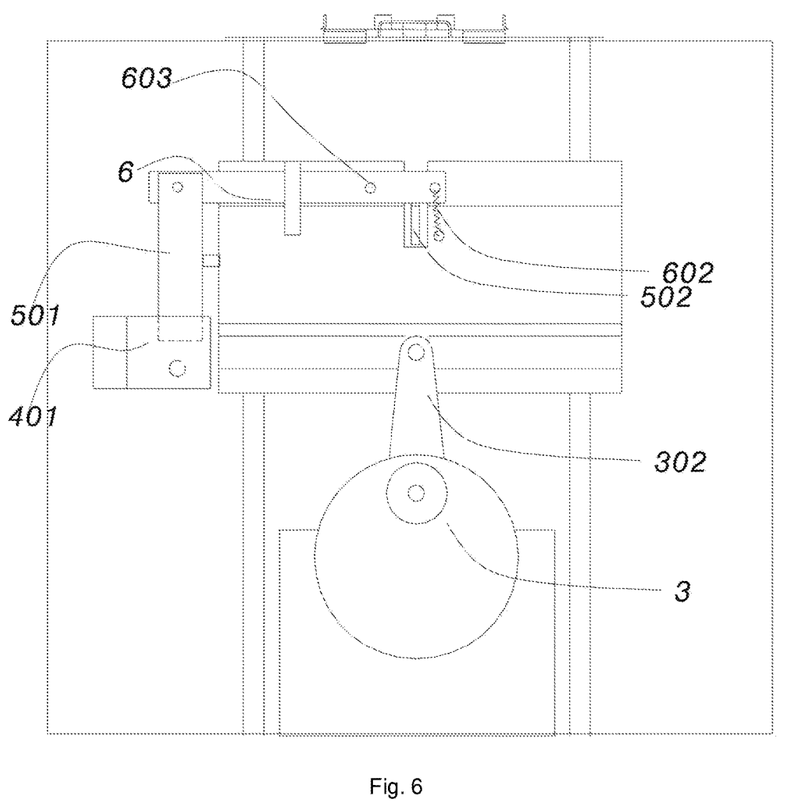
FIG. 6 is a schematic view of another preferred embodiment of the present invention.
Figure 7:
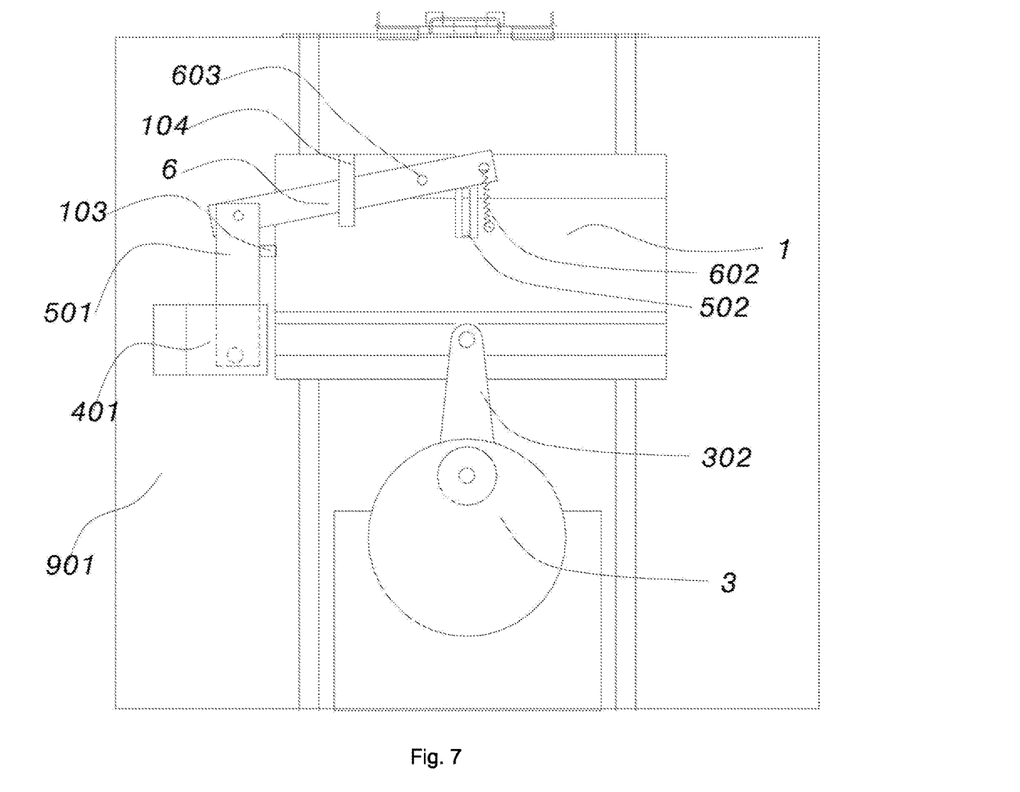
FIG. 7 is a schematic position view of a toast rack into which bread is placed in FIG. 6.
Figure 7A:
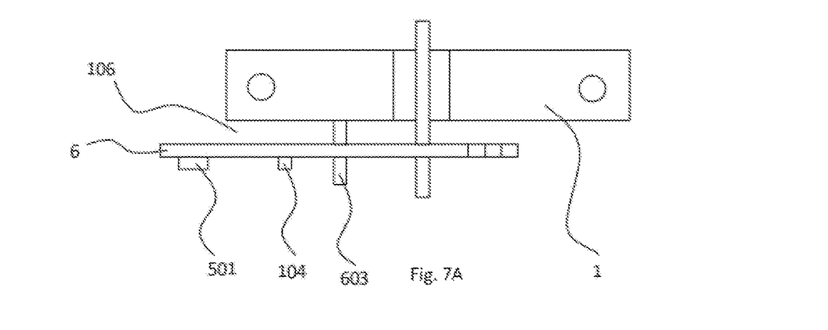

As illustrated in FIG. 6 and FIG. 7, in a second embodiment of the present invention, a pick 6 is hinged to a front end face of the sliding rack 1 via a hinge point 603. One end of the pick 6 is coupled to a tension spring I 602, and the other end of the pick 6 is hinged to the light barrier 501. The bracket 502 extends out of the sliding rack 1 and is disposed at a lower portion between the hinge point 603 and the coupling point of the tension spring I 602 of the pick 6. The sensing device 401 is disposed on a front supporting board of the toast frame 9, and corresponds to the light barrier 501 hinged to the pick 6 in terms of position. The sliding rack 1 is provided with a limit bar 104. The pick 6 is disposed in a limit groove formed between the sliding rack 1 and the limit bar 104, and restricts the sliding track of the pick 6. A lateral side of the sliding rack 1 corresponding to the light barrier 501 is provided with a limit bump 103, which limits leftward movement and rightward movement of the light barrier 501. When no bread is placed into the toaster, under a pulling force caused by the tension spring I 602 coupled to one end of the pick 6, the toast rack 5 and the free end of the toast rack 5 causes, via the hinge point 603 of the pick 6, the toast rack 5 to cock at an angle about the bracket 502 and the hinge point 101 on the sliding rack 1. In this case, the pick 6 stays in a horizontal state under the action of the tension spring I 602, the light barrier 501 hinged to the other end of the pick 6 stays in a vertical state and is parallel to the lateral side of the sliding rack 1. The light barrier 501 leaves away from the infrared transmitting-receiving diodes on the sensing device 401, such that the light barrier 501 does not block the infrared transmitting-receiving diodes on the sensing device 401. When bread is placed into the toast rack 5, under the gravity of the bread, the toast rack 5 rotates about the hinge point 101 of the bracket 502 on the sliding rack 1, the toast rack 5 overcomes the pulling force of the tension spring I 602, and makes the pick 6 to rotate about the hinge point 603 at a angle, such that one end of the pick 6 coupled to the tension spring I 602 is elevated upwards. Accordingly, the other end of the pick 6 hinged to the light barrier 501 rotates downwards. As a result, the pick 6 and the light barrier 501 hinged to the other end of the pick 6 rotate relative to one another, the light barrier 501 contacts the limit bump 103 and moves downwards and maintains parallel to the lateral side of the sliding rack 1. In this case, the light barrier 501 has moved downwards for a distance along a vertical direction, and is disposed inbetween the pair transistors of the infrared transmitting-receiving diodes. Therefore, the light barrier 501 blocks light transmitted by the infrared transmitting diode, and accordingly the infrared receiving diode fails to receive infrared light transmitted by the infrared transmitting diode.

The light barrier 501 blocks the infrared light of the sensing device 401 in the course of moving downwards, and thus a signal is generated and then transmitted to the CPU control circuit. The working principles are the same as those described in the previous embodiment. When the sliding rack 1 moves downwards, the toast rack 5 hinged to the sliding rack 1 drives the light barrier 501 to move downwards together, before reaching the bottom of the toast slot of the toaster. Upon completion of the bread toasting, the CPU control circuit controls the motor to drive the sliding rack 1 to reach the upper limit. In this course, although the light barrier 501 passes through the sensing device 401, the control circuit may determine that the sliding rack passes through the sensing device 401 in the elevation course, and accordingly may not control the motor to drive the sliding rack to move downwards. The other working processes may be referenced to the previous embodiment, which are thus not described herein any further. When the CPU control circuit controls the motor 3 to stop rotating, the bread is taken out, and the free end of the toast rack 5 cocks upwards under the pulling force of the tension spring I 602, the light barrier 501 moves upwards and leaves away from the infrared transmitting-receiving diodes on the sensing device 401 and stops blocking the infrared light transmitted by the infrared transmitting diode. In this way, a bread toast process is finished in the toaster.

Figure 8:
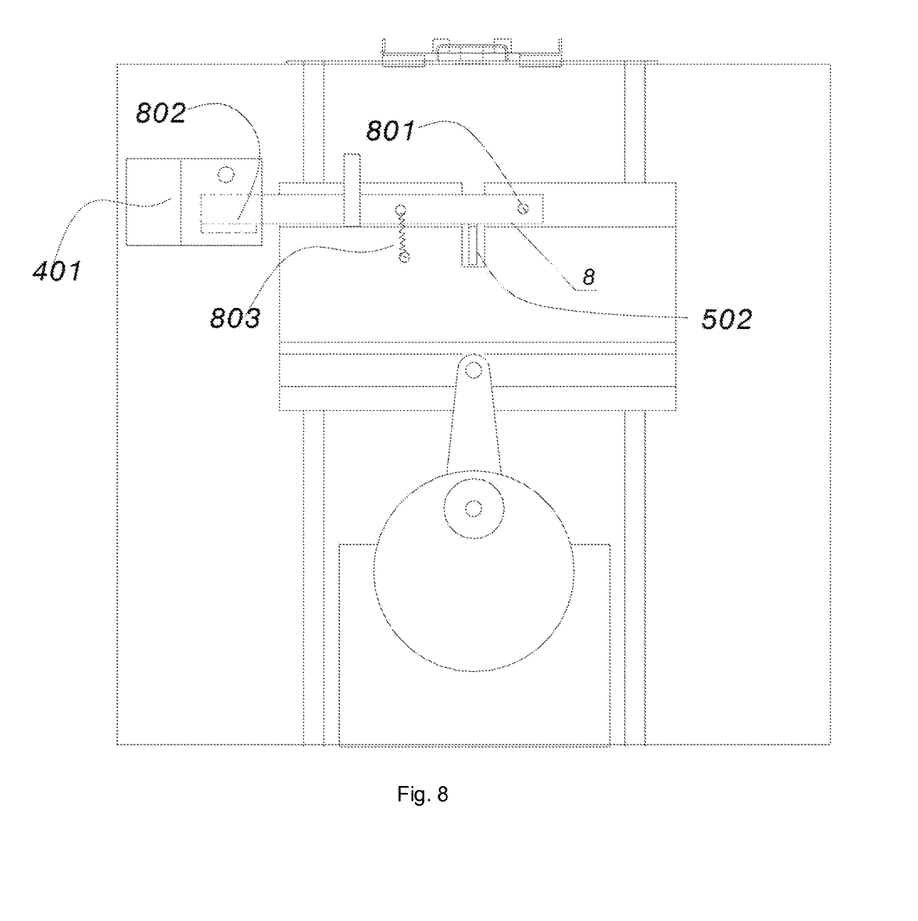
FIG. 8 is a schematic view of still another preferred embodiment of the present invention.
Figure 9:
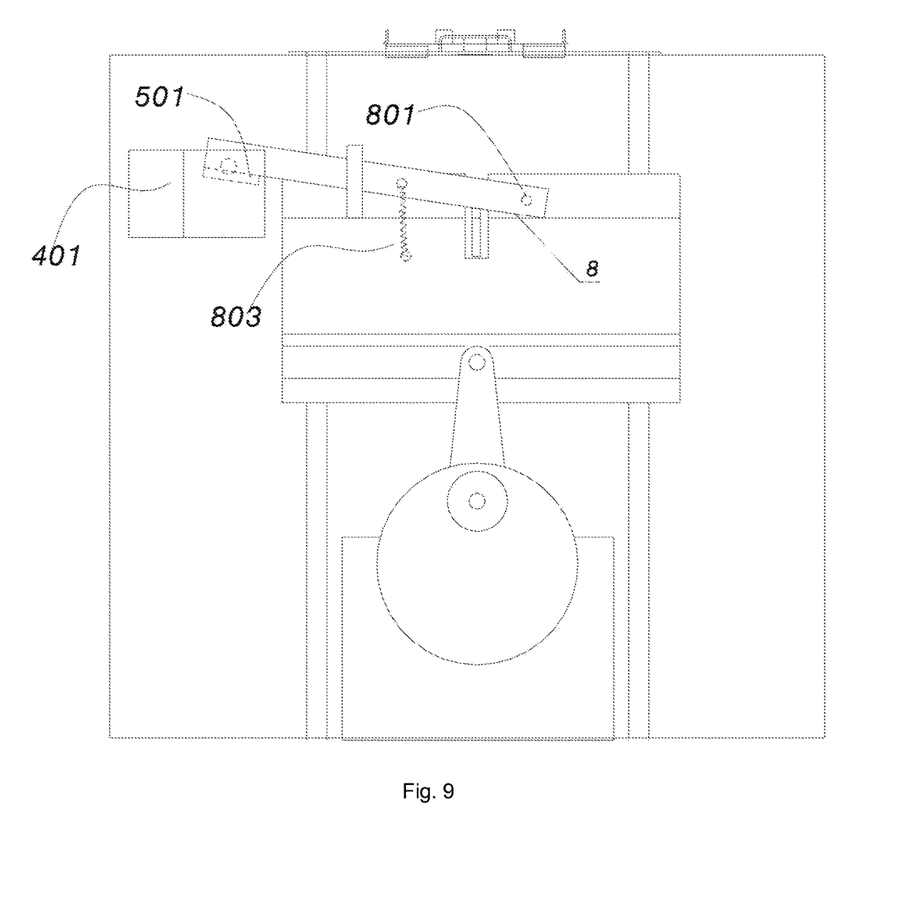
FIG. 9 is a schematic position view of a toast rack into which bread is placed in FIG. 8.

As illustrated in FIG. 8 and FIG. 9, in a third embodiment of the present invention, the front end face of the sliding rack is hinged to one end of a pick I 8 via a hinge point I 801, and the other end of the pick I 8 is hinged to the light barrier 501. A tension spring II 803 is coupled between the hinge point I 801 and the light barrier 501. The bracket 502 extends out of the sliding rack 1 and is disposed at a lower portion between the hinge point I 801 and the coupling point of the tension spring II 803. The sensing device 401 is disposed on a front supporting board of the toast frame 9, and corresponds to the light barrier 501 fixed to the other end of the pick I 8 in terms of position. The sliding rack 1 is provided with the limit bar 104. The pick I 8 is disposed in a limit groove formed between the sliding rack 1 and the limit bar 104, for restricting the movement track of the pick I 8. When no bread is placed into the toaster, under a pulling force caused by the hinge point I 801 and the tension spring II 803 of the pick I 8, the toast rack 5 and the free end of the toast rack 5 rotate about the bracket 502 and the hinge point 101 on the sliding rack 1 and accordingly cock at an angle. In this case, the pick I 8 stays in a horizontal state under the action of the tension spring II 803. The light barrier 501 fixed to the other end of the pick I 8 also leaves away from the infrared transmitting-receiving diodes on the sensing device 401. The light barrier 501 is disposed below the sensing device 401, such that the light barrier 501 does not block the transmission and receiving of the infrared light between the infrared transmitting-receiving diodes. When bread is placed into the toast rack 5, under the gravity of the bread, the toast rack rotates about the hinge point 101 of the bracket 502 on the sliding rack 1 and accordingly moves downwards. The toast rack 5 overcomes the tension force of the tension spring II 803, such that the pick I 8 also rotates at an angle about the hinge point I 801 and accordingly cocks upwards. In this case, the light barrier 501 fixed to the other end of the pick I 8 also cocks with the pick I 8 and is elevated. At this time, the light barrier 501 has moved for a distance along a vertical direction, and is disposed inbetween the pair transistors of the infrared transmitting-receiving diodes on the sensing device 401 and blocks the light transmitted by the infrared transmitting diode, such that the infrared receiving diode fails to receive the infrared light transmitted by the infrared transmitting diode.

The light barrier 501 blocks the infrared light of the sensing device 401 in the course of moving downwards, and thus a signal is generated and then transmitted to the CPU control circuit. The working principles are the same as those described in the previous embodiment. When the CPU control circuit controls the motor 3 to stop rotating, the bread is taken out, and the free end of the toast rack 5 cocks upwards on the bracket 502 under the pulling force of the tension spring II 803, the light barrier 501 moves downwards and leaves away from the infrared transmitting-receiving diodes on the sensing device 401 and stops blocking the infrared light transmitted by the infrared transmitting diode. In this way, a bread toast process is finished in the toaster.

The sensing device 401 may also employ a pair of a light-emitting diode and a light sensitive triode; or the light barrier 501 is replaced by a magnet, and the sensing device 401 incorporates a magnetic switch, to implement the same function.

The toast rack according to the present invention can be driven to rotate upwards to a certain angle about a center defined by the hinge point under the resilient force of a spring. When a bread slice is placed onto the toast rack, the toast rack is reset. The sensor can obtain a signal indicating that reset of the toast rack and transmit the signal to a control chip to control the toaster to be automatically initiated. The toaster according to the present invention is simple in structure and safe in use, and is of a low cost.

What is claimed is:

1. An actuating mechanism for a toaster, comprising a toast frame arranged in a housing, a sliding rack capable of moving upwards and downwards, and a control circuit, a toast rack being coupled to the sliding rack, a bracket being fixed to one end of the toast rack, the bracket being hinged to the sliding rack, wherein the actuating mechanism is provided with a sensing device for identifying an angular displacement of the bracket, and the bracket drives a light barrier, the sensing device being arranged on a movement track of the light barrier, the light barrier being capable of blocking a sensing light passage of the sensing device, the sensing device being coupled to the control circuit via a data line, wherein a pick is hinged to a front end face of the sliding rack via a hinge point, a tension spring I being coupled to one end of the pick, and the light barrier being hinged to the other end of the pick; the bracket extends out of the sliding rack and is disposed at a lower portion between the hinge point and the coupling point of the tension spring I of the pick; the light barrier corresponds to the sensing device in terms of position; the sliding rack is provided with a limit bar, the pick being disposed in a groove between the sliding rack and the limit bar; and a limit bump is arranged on a lateral side of the sliding rack corresponding to the light barrier;

wherein the sensing device is fixed to an upper portion of a motor stand.

2. An actuating mechanism for a toaster, comprising a toast frame arranged in a housing, a sliding rack capable of moving upwards and downwards, and a control circuit, a toast rack being coupled to the sliding rack, a bracket being fixed to one end of the toast rack, the bracket being hinged to the sliding rack, wherein the actuating mechanism is provided with a sensing device for identifying an angular displacement of the bracket, and the bracket drives a light barrier, the sensing device being arranged on a movement track of the light barrier, the light barrier being capable of blocking a sensing light passage of the sensing device, the sensing device being coupled to the control circuit via a data line, wherein a pick is hinged to a front end face of the sliding rack via a hinge point, a tension spring I being coupled to one end of the pick, and the light barrier being hinged to the other end of the pick; the bracket extends out of the sliding rack and is disposed at a lower portion between the hinge point and the coupling point of the tension spring I of the pick; the light barrier corresponds to the sensing device in terms of position; the sliding rack is provided with a limit bar, the pick being disposed in a groove between the sliding rack and the limit bar and a limit bump is arranged on a lateral side of the sliding rack corresponding to the light barrier;

wherein the sensing device is fixed to a front supporting board of the toast frame.

3. An actuating mechanism for a toaster, comprising a toast frame arranged in a housing, a sliding rack capable of moving upwards and downwards, and a control circuit, a toast rack being coupled to the sliding rack, a bracket being fixed to one end of the toast rack, the bracket being hinged to the sliding rack, wherein the actuating mechanism is provided with a sensing device for identifying an angular displacement of the bracket, and the bracket drives a light barrier, the sensing device being arranged on a movement track of the light barrier, the light barrier being capable of blocking a sensing light passage of the sensing device, the sensing device being coupled to the control circuit via a data line, wherein a pick is hinged to a front end face of the sliding rack via a hinge point, a tension spring I being coupled to one end of the pick, and the light barrier being hinged to the other end of the pick; the bracket extends out of the sliding rack and is disposed at a lower portion between the hinge point and the coupling point of the tension spring I of the pick; the light barrier corresponds to the sensing device in terms of position; the sliding rack is provided with a limit bar, the pick being disposed in a groove between the sliding rack and the limit bar; and a limit bump is arranged on a lateral side of the sliding rack corresponding to the light barrier;

wherein the sensing device comprises infrared transmitting-receiving diodes that are oppositely arranged.

4. An actuating mechanism for a toaster, comprising a toast frame arranged in a housing, a sliding rack capable of moving upwards and downwards, and a control circuit, a toast rack being coupled to the sliding rack, a bracket being fixed to one end of the toast rack, the bracket being hinged to the sliding rack, wherein the actuating mechanism is provided with a sensing device for identifying an angular displacement of the bracket, and the bracket drives a light barrier, the sensing device being arranged on a movement track of the light barrier, the light barrier being capable of blocking a sensing light passage of the sensing device, the sensing device being coupled to the control circuit via a data line, wherein a pick is hinged to a front end face of the sliding rack via a hinge point, a tension spring I being coupled to one end of the pick, and the light barrier being hinged to the other end of the pick; the bracket extends out of the sliding rack and is disposed at a lower portion between the hinge point and the coupling point of the tension spring I of the pick; the light barrier corresponds to the sensing device in terms of position: the sliding rack is provided with a limit bar, the pick being disposed in a groove between the sliding rack and the limit bar; and a limit bump is arranged on a lateral side of the sliding rack corresponding to the light barrier;

wherein the sensing device comprises a light sensitive element and a light-emitting diode that are oppositely arranged.

* * * * *